Jan. 9, 1945.                N. E. COLE                2,366,698
                         ADJUSTABLE SPLICE
                       Filed Dec. 2, 1943            2 Sheets-Sheet 1
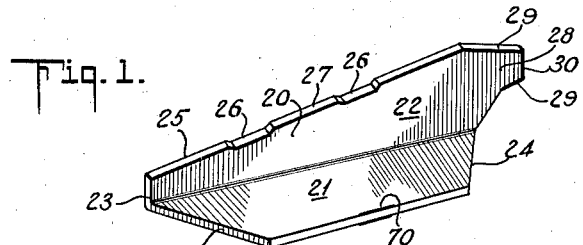
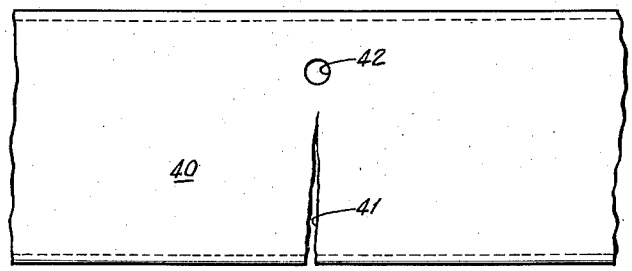
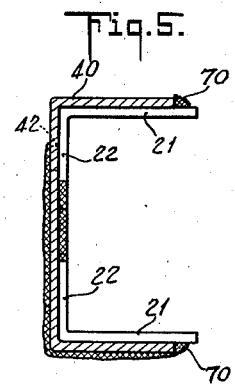
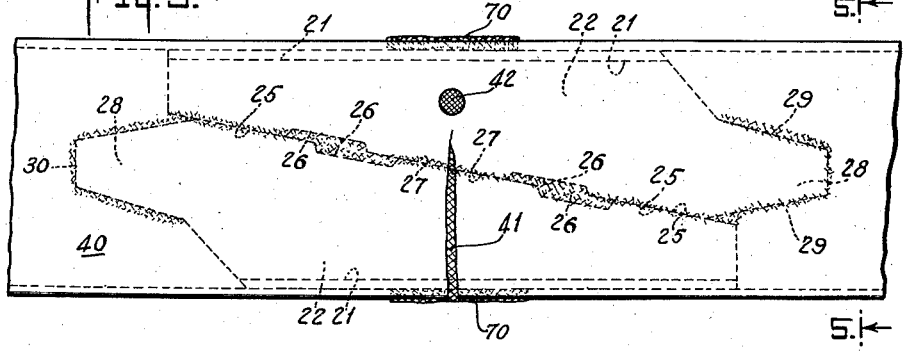
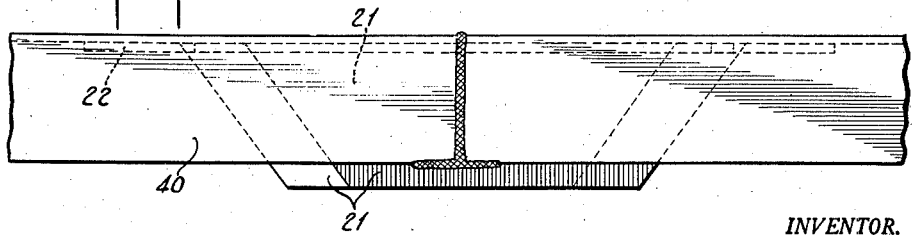
INVENTOR.
NELSON EDWARD COLE
BY
ATTORNEY Jan. 9, 1945. N. E. COLE 2,366,698
ADJUSTABLE SPLICE
Filed Dec. 2, 1943 2 Sheets-Sheet 2
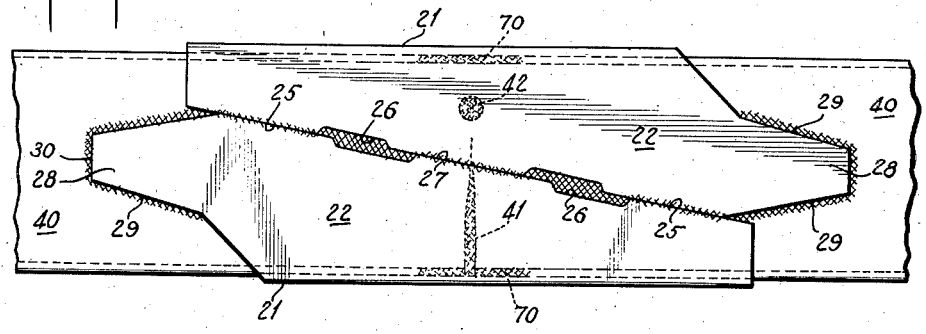
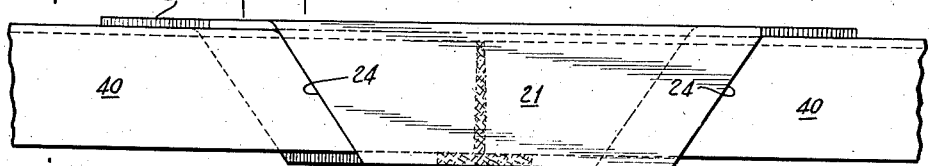
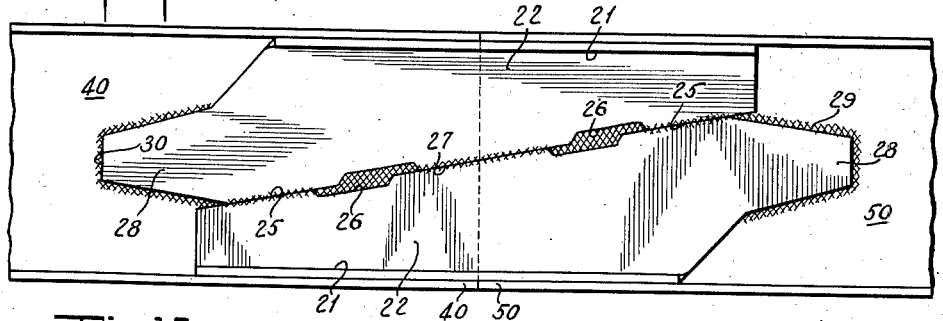
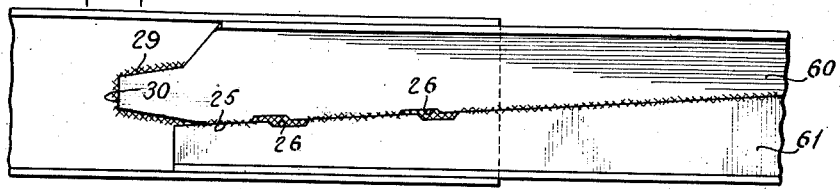
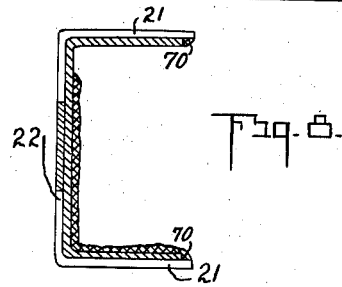
INVENTOR.
NELSON EDWARD COLE
ATTORNEY.

Patented Jan. 9, 1945

2,366,698

UNITED STATES PATENT OFFICE 2,366,698

ADJUSTABLE SPLICE

Nelson E. Cole, Reading, Pa., assignor to Parish Pressed Steel Company, Reading, Pa., a corporation of Virginia Application December 2, 1943, Serial No. 512,663

12 Claims. (Cl. 189—36)

My invention relates to adjustable splices for splicing and/or reinforcing channel members, and more particularly to built up channel splices for repairing as well as lengthening automotive and truck chassis frames and has for its object to produce such an adjustable splice, so simple in construction, that it can be applied in the field or in a body shop without special machinery or tools for the purpose.

Automotive and truck chassis frames are subjected to overloading stresses and fatigue conditions set up by changing load and road hazards and consequently failures are bound to come. One of the objects of my invention is to produce an adjustable channel splice and a method of installing it, so that repairs can be made in most cases without dismantling the body and/or engine.

I have discovered that there is a certain longitudinal zone in a channel beam member of a chassis within which any amount of electric welding may be safely done without tearing down, due to the annealing action of the welding heat, the capacity of the heat treated steel beam fiber for resisting tensile and compressive stresses set up by bending action caused by external loads applied to the beam.

This zone runs along the central longitudinal or neutral axis. The limit in width of this zone approximates ½ the total depth of the channel beam, that is ¼ the total depth of the channel beam on either side of its central longitudinal or neutral axis.

To keep the weld within this zone I provide two angular pieces which can be adjusted to a drive fit within the channel or a close fit on the outside of the channel as conditions in the field seem to warrant. The opposing edges of the angular members are so formed that the weld will substantially take the shape of an S and will be localized in this safety zone within which any amount of electrical welding may be safely done without impairing the working strength of the beam.

The foregoing and other features of my invention will now be described in connection with the accompanying drawings forming part of this specification in which I have represented my adjustable splice in its preferred form after which I shall point out more particularly in the claims those features which I believe to be new and of my own invention.

In the drawings:

Figure 1 is an isometric view of one of a pair of splice angles which I employ in making a splice.

Figure 2 is a side view of any channel which may be a side beam of a truck or automotive frame showing the fracture to be repaired.

Figure 3 is a side view of the finished splice, splice angles inside the channel.

Figure 4 is a bottom view of splice shown in Figure 3.

Figure 5 is a sectional view on line 5—5, Figure 3.

Figure 6 is a side view, similar to that shown in Figure 3, splice angles outside the channel.

Figure 7 is a bottom view thereof.

Figure 8 is a section along the line 8—8, Figure 7.

Figure 9 is a modification in which two channel members are spliced together. Side view similar to that shown in Figure 3.

Figure 10 is a modification which I may employ.

In carrying out my invention I employ two splice members like that shown in Figure 1, each comprising an angular shaped piece 20 with legs 21, 22, the heel 23 of the angle being along the line of joinder of the legs 21 and 22. The leg 21 has both its ends 24 cut at acute angle to the heel 23 of the angle. The other leg 22 is cut diagonally as at 25 and this edge is provided with a plurality of notches 26, the length of the notches being substantially one-half the length of the riser 27 spaced between the notches 26.

The larger end 28 of the leg 22 is formed with diagonal corners 29, said diagonal edges approaching each other at the extreme end forming a small blunt edge or portion 30.

It will be noticed that by the process of narrowing down the end portion 28, the vertical line 30 at the extreme end of 28 becomes shorter in proportion to the amount of distance it lays from the mid-section of the splice. It is desirable to keep this end as short as possible, consistent with its use as a driving edge so as to present a welding edge as short as possible which stands directly in any one vertical cross section of the channel beam being spliced. The length of this vertical weld line should be proportioned as nearly equal as is practicable above and below the neutral axis of the channel beam being spliced.

The diagonal cuts 24 on each end of leg 21 and the irregular shape shown at the 28 end of leg 22 are made for stress relieving purposes. Notice that there are no edges of these ends of the splice pieces which are parallel to any line outlining any vertical cross sectional element of the beam to be repaired except at the extreme small ends of the splice members which lie in a limited zone near the neutral axis of the beam.

In making a combination welding and splicing joint, two of the above described angular members 22 are used with complementary diagonal portions 25 which tightly contact each other.

In Figure 2 will be seen a typical channel beam of an automotive or truck chassis 40 with a fracture 41 which it is proposed to repair.

Fractures of this common type are due to excessive over-loading and consequent over-stressing, usually occur at the bottom or tension flange of the frame side rail.

A relieving hole 42 is drilled a little beyond the end of the visible crack 41. This hole should be in diameter at least two or three times the thickness of the metal through which it is drilled.

The object of this hole is to insure a thorough job of welding and to prevent any continued opening of the same crack after the frame is again placed under loading stresses.

The next step is to grind off both outside edges, or grind a V cut into the frame over the crack so as to form a deep chamfer for penetration and secure welding.

If the frame or beam 40 is out of line it must be straightened and aligned to close the crack 41.

Where the splice is installed on the inside of the channel 40 which is the preferable manner, as shown in Figures 3, 4, 5, the wedges are driven in place so that the opposing diagonal edges 25 of the leg 22 tightly engage each other. In this position the notches 26 are slightly staggered. The angular wedges 20 should be carefully selected for the repair with the thickness of the metal equal or greater than the thickness of the channel beam to be spliced.

In carrying out the welding operation, first, the crack 41 itself and the hole 42 are securely welded up, the crack with a solid line of weld free from any blow holes or flaws. After that operation is completed, weld along the line of joinder of the two opposing diagonal edges 25, the notches 26 permitting the metal to flow through to and alloy with the metal of the channel 40. Continue the weld around both the enlarged ends 28 as shown by the dotted hatched lines. It will be observed that the weld takes the form of an S lying down. It will be noticed that this entire weld bead also lies within a central zone in the web of the beam, well within a neutral strip in width ½ the total depth of the beam. With this weld it will also be noticed that with the narrowing of the ends 28 as they reach the extreme end of the splice there is a shorter portion 30 of vertical weld lying within any cross section of the beam. These two features are of the greatest importance because with the weld confined within this neutral zone any amount of welding can be safely done without impairing the strength of the beam.

Welding is not permitted at the edges of the flanges except within a limited zone confined at the middle third of the outside of projecting edge of 21. The question of where to weld and where not to weld is made simple for the man in the shop because I propose to mark every splice piece, showing the exact locations of the welding beads. The heavy line on Figure 1 shows this readily.

Where it is not convenient to easily assemble the angular members as wedges within the channel beam as shown in Figure 3, it may be convenient to adapt them to the outside of the channel as shown in Figures 6, 7 and 8. Here the angular splice members are tightly clamped on the outside of the flange of the channel beam 40 with the same welding operation as heretofore described.

I may adapt my method and splice to the lengthening of a channel beam. Such a method is illustrated in Figure 9. Here, two channel sections 40 and 50 are brought end to end and the angular splice pieces 20 put in place as shown and spliced as fully described. This lengthening operation may also be obtained by making two extension pieces 60 and 61 formed on their ends as are the angular splice pieces 20.

The legs 21 may be welded to the channel as shown at 70 extending on each side of the crack 41, said weld bead to be substantially ⅓ the length of the outer edge of the leg 21.

I wish it distinctly understood that my adjustable splice is in the form in which I desire to construct it and that changes or variations may be made as may be convenient or desirable without departing from the salient features of my invention and I therefore intend the following claims to cover such modifications as naturally fall within the lines of invention.

I claim:

1. An adjustable splice member comprising an angular shaped piece, one leg having both its ends cut at an acute angle to the heel of the angle, the other leg cut diagonally the length of the leg and having its larger end cut in an irregular shape so that there is an edge of the leg which is perpendicular to the length of the leg and which is as short as possible consistent with its use as a driving edge.

2. The device of claim 1, with the addition that notches are formed in the diagonal side of the leg.

3. The device of claim 1 in which the diagonal side of the leg is formed with notches the length of which is substantially half the length of the riser between the notches.

4. An adjustable splice member comprising an angular shaped member, one leg having both its ends cut at acute angle to the line of joinder of the leg positions, the other leg cut diagonally the length in an irregular line, the large end of this leg cut diagonally on both corners making an obtuse angle with the outer edge of the leg and with the line of joinder of the leg portion, said diagonal sides approaching each other at the extreme end forming a blunt portion.

5. The device of claim 4 in which the broken line comprises a series of hills and dales.

6. The device of claim 4 in which the broken line comprises a series of hills and dales the hills being substantially twice the length of the width of the dale.

7. An adjustable splice for splicing channel members, comprising in combination, two adjustable splice members each comprising an angular shaped piece, one leg having both its ends cut at an acute angle to the heel of the angle, the other leg cut diagonally the length of the leg forming a wedge shaped leg and having its larger end cut in an irregular shape so that there is an edge of the leg which is perpendicular to the length of the leg and which is as short as possible consistent with its use as a driving edge, said splice members set tight against the channel member to be spliced with the wedge shaped legs opposing each other; a weld bead located along the line of joinder of the wedge shaped portions extending on each end to embrace the large ends of both legs and forming a weld bead having an irregular shape substantially in the form of an S, said weld located along the longitudinal axis of the channel member and located within an area having a width not more than 50% of the depth of the channel member.

8. The splice of claim 7 with the addition of weld beads located on the legs having both ends cut at acute angles, said welds to be not more than ⅓ the length of the outer edge of the leg member.

9. The splice of claim 7 with the addition that the angular splice member is welded to the channel through the first mentioned leg member, the length of said weld to be substantially ⅓ the length of the outer edge of the leg member.

10. An adjustable splice for splicing channel members comprising in combination, two angular members each provided with a wedge shape leg portion, adapted to abut each other forming a secondary channel when fitted tightly against the channel, a weld bead located along the line of joinder of the wedge shape portion extending on each end to embrace the larger end of the legs, said weld bead located along the axis of the longitudinal axis of the channel member and confined within an area having a width not more than 50% of the depth of the channel member.

11. The splice of claim 10 in which the wedging edges of the angular members are provided with notches.

12. The splice of claim 10 in which the wedging edge of the angular members is formed with notches the length of which is substantially half of the length of the rise between the notches.

NELSON E. COLE.